United States Patent
Chen

(10) Patent No.: US 7,684,121 B2
(45) Date of Patent: Mar. 23, 2010

(54) VARIABLE FOCAL LENGTH LENS AND LENS MODULE WITH THE SAME

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 431 days.

(21) Appl. No.: 11/309,913

(22) Filed: Oct. 27, 2006

(65) Prior Publication Data

US 2007/0211349 A1 Sep. 13, 2007

(30) Foreign Application Priority Data

Mar. 10, 2006 (CN) .................... 2006 1 0034356

(51) Int. Cl.
*G02B 1/06* (2006.01)

(52) U.S. Cl. .................. 359/666; 359/667; 359/676; 359/703

(58) Field of Classification Search ......... 359/665–667, 359/676, 694
See application file for complete search history.

(56) References Cited

U.S. PATENT DOCUMENTS

| 4,586,787 | A | * | 5/1986 | Fiandra et al. | ............... 359/830 |
|---|---|---|---|---|---|
| 4,676,614 | A | * | 6/1987 | Ohno | .................... 353/101 |
| 5,684,637 | A | * | 11/1997 | Floyd | .................... 359/666 |
| 5,917,657 | A | * | 6/1999 | Kaneko et al. | ............... 359/661 |
| 6,081,388 | A | * | 6/2000 | Widl | .................... 359/666 |
| 6,721,104 | B2 | * | 4/2004 | Schachar et al. | ............. 359/676 |
| 6,930,838 | B2 | | 8/2005 | Schachar | |
| 7,209,297 | B2 | * | 4/2007 | Chen et al. | ................... 359/676 |
| 2004/0008419 | A1 | * | 1/2004 | Schachar | ................... 359/666 |
| 2004/0190153 | A1 | * | 9/2004 | Esch | .................... 359/666 |
| 2006/0245073 | A1 | * | 11/2006 | Yu | .................... 359/676 |
| 2007/0014029 | A1 | * | 1/2007 | Chen et al. | ................... 359/676 |
| 2008/0084532 | A1 | * | 4/2008 | Kurtin | .................... 351/57 |
| 2008/0144187 | A1 | * | 6/2008 | Gunasekaran et al. | ........ 359/666 |

FOREIGN PATENT DOCUMENTS

| CN | 1189219 A | 7/1998 |
|---|---|---|
| CN | 2665731 Y | 12/2004 |

* cited by examiner

*Primary Examiner*—Jordan M. Schwartz
(74) *Attorney, Agent, or Firm*—Clifford O. Chi

(57) ABSTRACT

A variable focal length lens includes a deformable lens body and at least one lens deforming device arranged around the lens body configured for radially deforming the lens body so as to adjust an effective focal length associated with the lens body. A lens module with the variable focal length lens is provided in the present invention. The lens module can auto focus and zoom without requiring an actuator.

19 Claims, 7 Drawing Sheets

VARIABLE FOCAL LENGTH LENS AND LENS MODULE WITH THE SAME

TECHNICAL FIELD

The present invention relates to lenses, and more particularly to a variable focal length lens and a lens module with the same for use in, for example, digital cameras.

DISCUSSION OF RELATED ART

Variable focal length lenses are widely used in optical systems. Optical systems incorporating such lenses can, for example, provide focused images of objects at varying distances from the lens to an image plane without changing the distance between the lens and the image plane. Variable focal length lenses can also be used in optical systems that provide varying magnification without changing lenses.

Many types of variable focal length lenses have been proposed. The design most widely used at present in optical instruments, such as cameras, telescopes, binoculars and microscopes, is a multi-element lens module wherein the focal length is varied by changing the internal spacing of two or more of the elements along the optical axis. Generally, the lens system usually uses an actuator, such as step motor, to drive the lens module. However, the step motor is relatively bulky in volume. In addition, the step motor consumes a substantial amount of power, especially relative to the amount of power that can be stored in the typical battery system.

Therefore, what is needed is a variable focal length lens adapted for a variable focus optical system without the need for large mechanical movement.

SUMMARY

A variable focal length lens and a lens module with the same according to a preferred embodiment is provided.

The variable focal length lens includes a deformable lens body and at least one lens deforming device arranged around the lens body configured for radially deforming the lens body so as to adjust an effective focal length associated with the lens body.

The lens module includes a barrel and at least one above-described variable focal length lens, the at least one lens deforming device of the at least one variable focal length lens being mounted in the barrel.

BRIEF DESCRIPTION OF THE DRAWINGS

Many aspects of the present variable focal length lens and lens module with the same can be better understood by reference to the following description of embodiments thereof taken in conjunction with the accompanying drawings.

The exemplifications set out herein illustrate at least one preferred embodiment of the present variable focal length lens and lens module with the same, in one form, and such exemplifications are not to be construed as limiting the scope of the invention in any manner.

DETAILED DESCRIPTION OF PREFERRED EMBODIMENTS

Reference will now be made to the drawings to describe in detail the preferred embodiments of the present variable focal length lens and lens module with the same, in detail.

Figure 1:
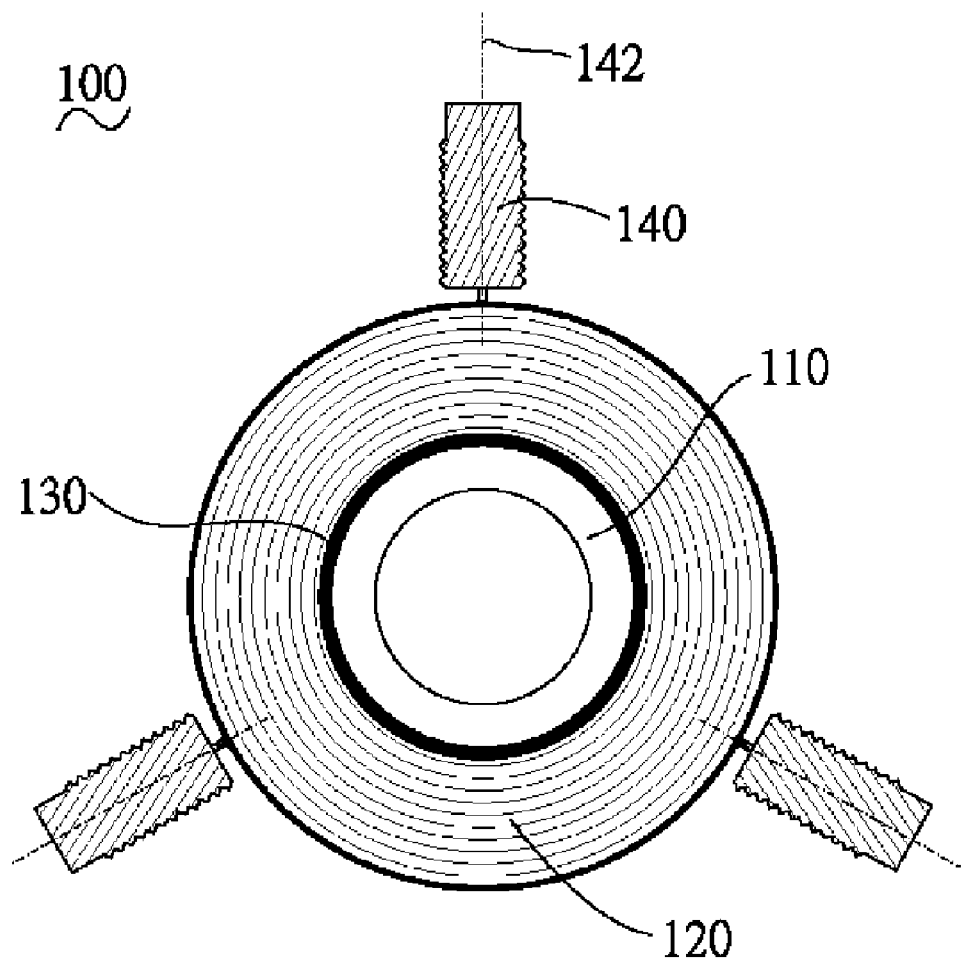
FIG. 1 is a schematic, cross-sectional view of a variable focal length lens in accordance with a first embodiment of the present invention.

Referring to FIG. 1, a variable focal length lens 100 mainly includes a deformable lens body 110 and a lens deforming device 120 arranged around the lens body 110.

The deformable lens body 110 is meniscus-shaped and may be made of a material such as silicone rubber, polyethylene, polypropylene, modified polystyrene, transparent polyurethane elastomer, polyethylene terephthalate, cyclic olefin polymer (COP), or any combination thereof. In the present embodiment, the deformable lens body 110 is advantageously made of COP due to its high transparency and good deformability. COP has a transparency of above 95%, a specific gravity of 1.01, and a specific elongation of over 40%. Preferably, a center thickness of the deformable lens body 110 is in the range from about 50 microns to about 500 microns, and a diameter of the deformable lens body 110 is in the range from about 2 mm to about 4 mm.

The lens deforming device 120 is a bellows mechanism surrounding the lens body 110 and is configured for radially deforming the lens body 110 so as to adjust an effective focal length of the lens body 110. The lens deforming device 120 can be connected to the lens body 110 using epoxy resin adhesive 130. The epoxy resin adhesive 130 can be a thermal curable epoxy resin adhesive.

In the present embodiment, the variable focal length lens 100 further includes three driving devices 140 surrounding the lens deforming device 120 uniformly. Each of the driving devices 140 is pivotally connected to the lens deforming device 120, i.e., each of the driving devices 140 can rotate on its axis 142 when it exerts a radial force on the lens deforming device 120. When a radial force is applied to the lens deforming device 120, the lens deforming device 120 can be elongated or compressed in its radial direction to cause a deformation of the main body 110. The three driving devices 140 can be driven by one motor (not labeled) or by three motors. It is understood that more or less driving devices 140 may be used according to need.

Figure 2:
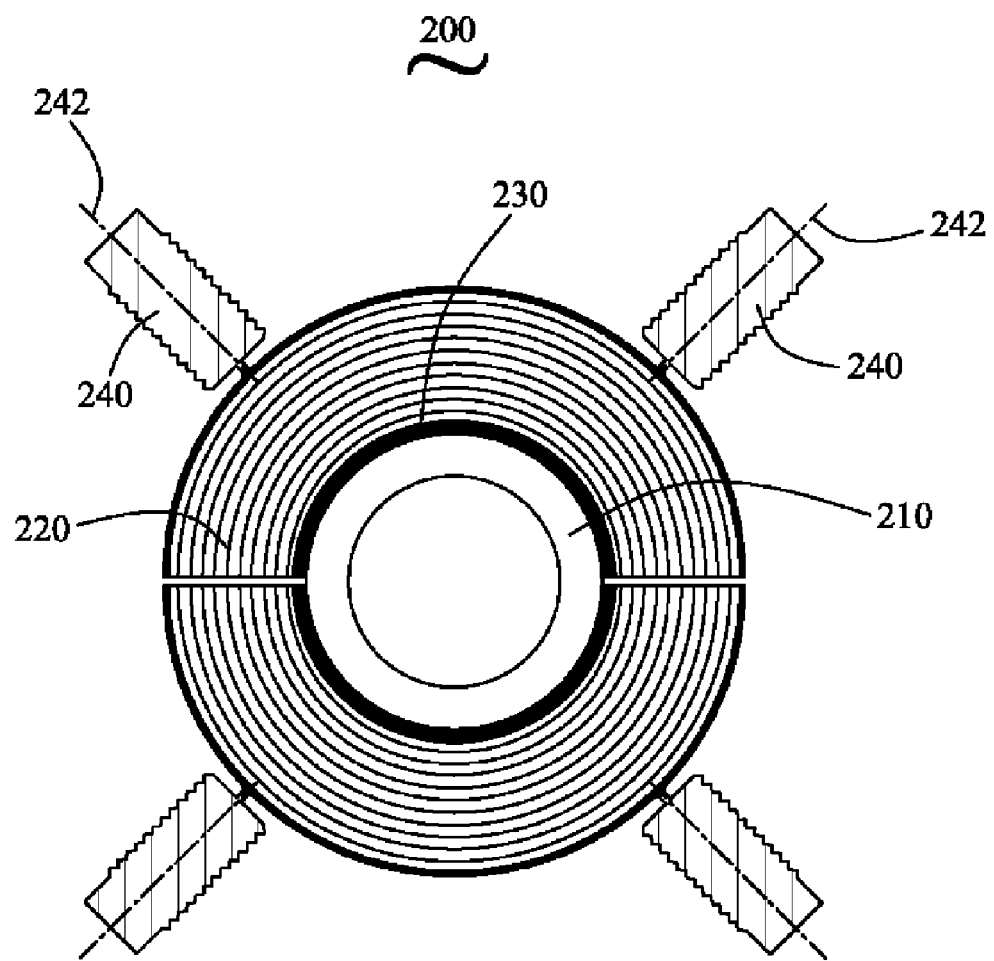
FIG. 2 is a schematic, cross-sectional view of a variable focal length lens in accordance with a second embodiment of the present invention.

It is understood that more than one lens deforming device and more than three driving devices in a variable focal length lens. Referring to FIG. 2, a variable focal length lens 200 of a second preferred embodiment of the present invention is shown. The variable focal length lens 200 includes a deformable lens body 210 composed of COP, two lens deforming devices 220 arranged around the lens body 210 uniformly configured for exerting a radial force on the lens body 210 and four driving devices 240 surrounding the lens deforming devices 220 and distributed uniformly around the lens body 210. The lens deforming devices 220 can be connected to the lens body 210 using epoxy resin adhesive 230. The driving devices 240 are pivotally connected to the lens deforming devices 220, i.e., each of the driving devices 240 can rotate on its axis 242 when it exerts a radial force on the lens deforming device 220.

Figure 3:
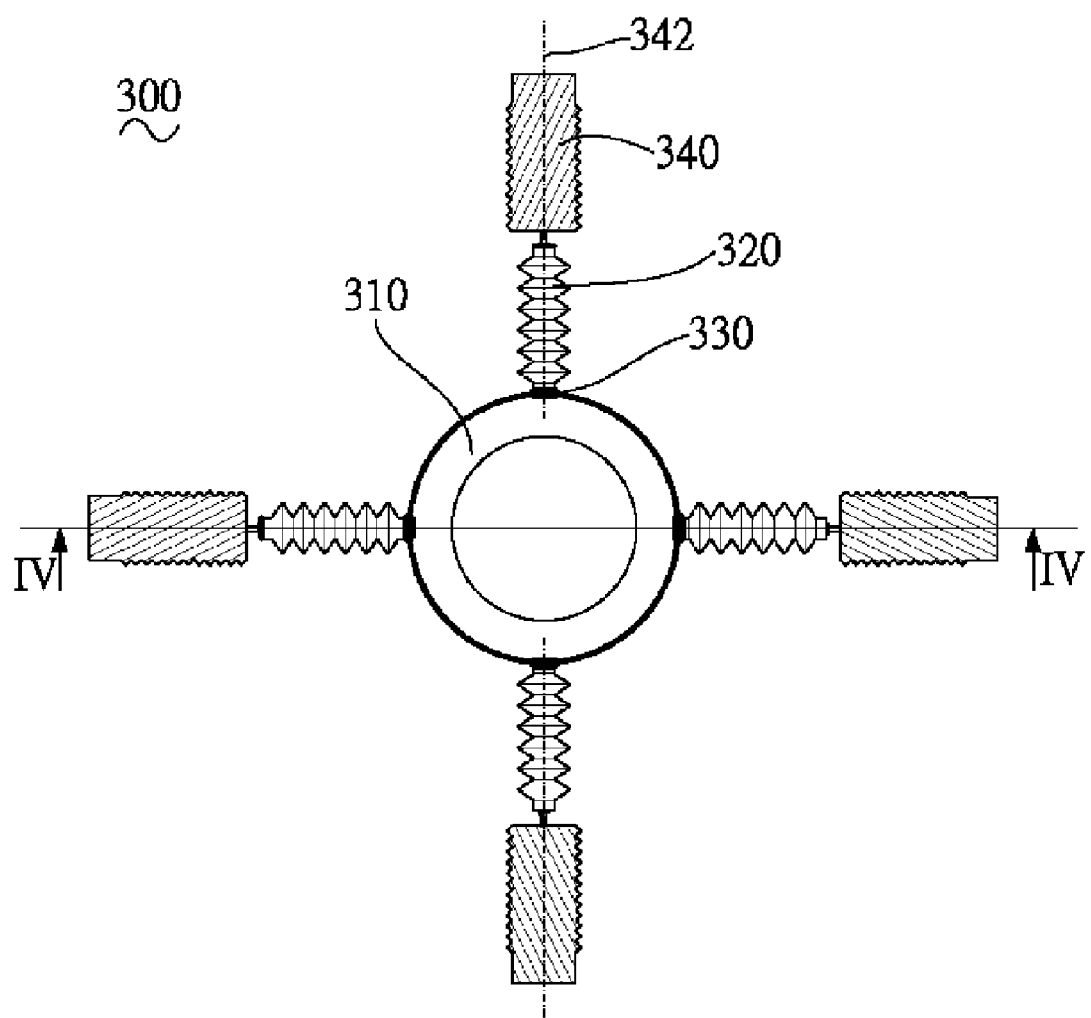
FIG. 3 is a schematic, cross-sectional view of a variable focal length lens in accordance with a third embodiment of the present invention.

Referring to FIG. 3, a variable focal length lens 300 of a third preferred embodiment of the present invention is shown. The variable focal length lens 300 includes a deformable lens body 310 composed of COP, four lens deforming devices 320 arranged around the lens body 310 configured for exerting a radial force on the lens body 310 and four driving devices 340 surrounding the lens deforming devices 320 configured for driving the lens deforming devices 320 to radially expand or contract. The lens deforming devices 320 can be connected to the lens body 310 using epoxy resin adhesive 330. The driving devices 340 are pivotally connected to the lens deforming devices 320 and each of the driving devices 340 can rotate on its axis 342 when it exerts a radial force on the lens deforming device 320. Alternatively, the lens deforming devices 320 can be connected to the driving devices 340 using epoxy resin adhesive, and the lens deforming devices 320 can be pivotally connected to the lens body 310.

Figure 4:
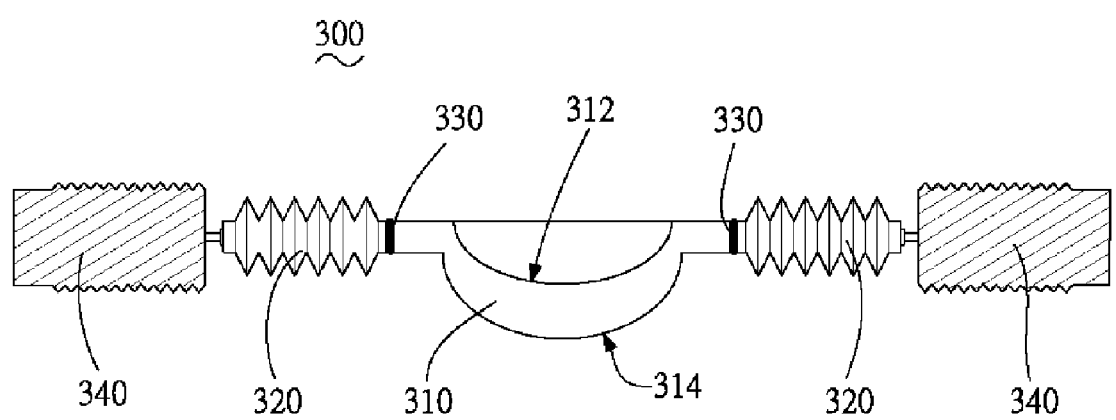
FIGS. 4 to 6 are schematic, cross-sectional views of the variable focal length lens of FIG. 3 taken from line IV-IV in different status.

The operation principle of the present variable focal length lens 300 is described as follows. Referring to FIG. 4, a schematic, cross-sectional view of the variable focal length lens 300 of FIG. 3 taken from line IV-IV is shown. The variable focal length lens 300 has a first curvature surface 312 and a second curvature surface 314. In one status, the first curvature surface 312 and the second curvature surface 314 each have an individual radius of curvature, i.e., the variable focal length lens 300 has a focal length.

Figure 5:
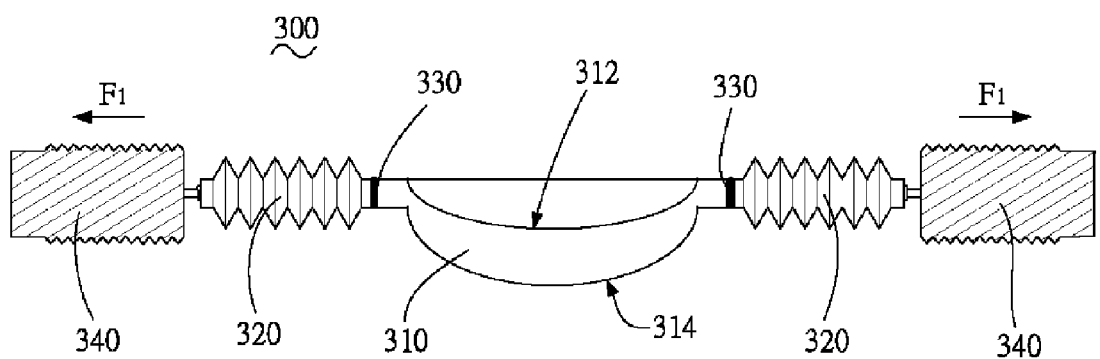

Referring to FIG. 5, when the driving devices 340 exerts outward radial force F1 on the lens deforming devices 320, the lens deforming devices 320 are elongated under the action of the outward radial force F1, and the lens body 310 is also elongated and deformed. The center thickness of the lens body 310 is decreased with resulting increase in the radius of curvature of the first curvature surface 312 and the second curvature surface 314, which causes the focal length of the variable focal length lens 300 to be increased.

Figure 6:
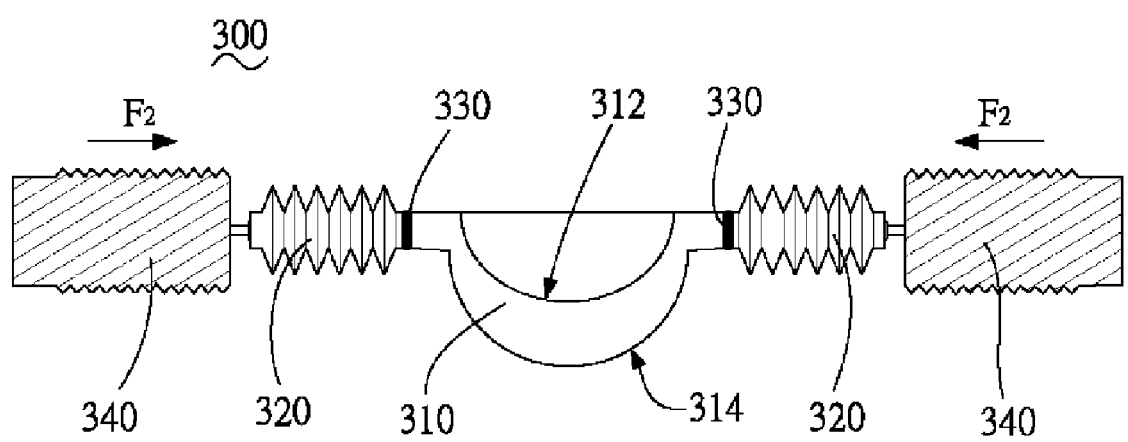

Referring to FIG. 6, when the driving devices 340 exert inward radial force F2 on the lens deforming devices 320, the lens deforming devices 320 are compressed under the action of the inward radial force F2, and the lens body 310 is also compressed and deformed. The center thickness of the lens body 310 is increased with resulting decrease in the radius of curvature of the first curvature surface 312 and the second curvature surface 314, which causes the focal length of the variable focal length lens 300 to be decreased.

Figure 7:
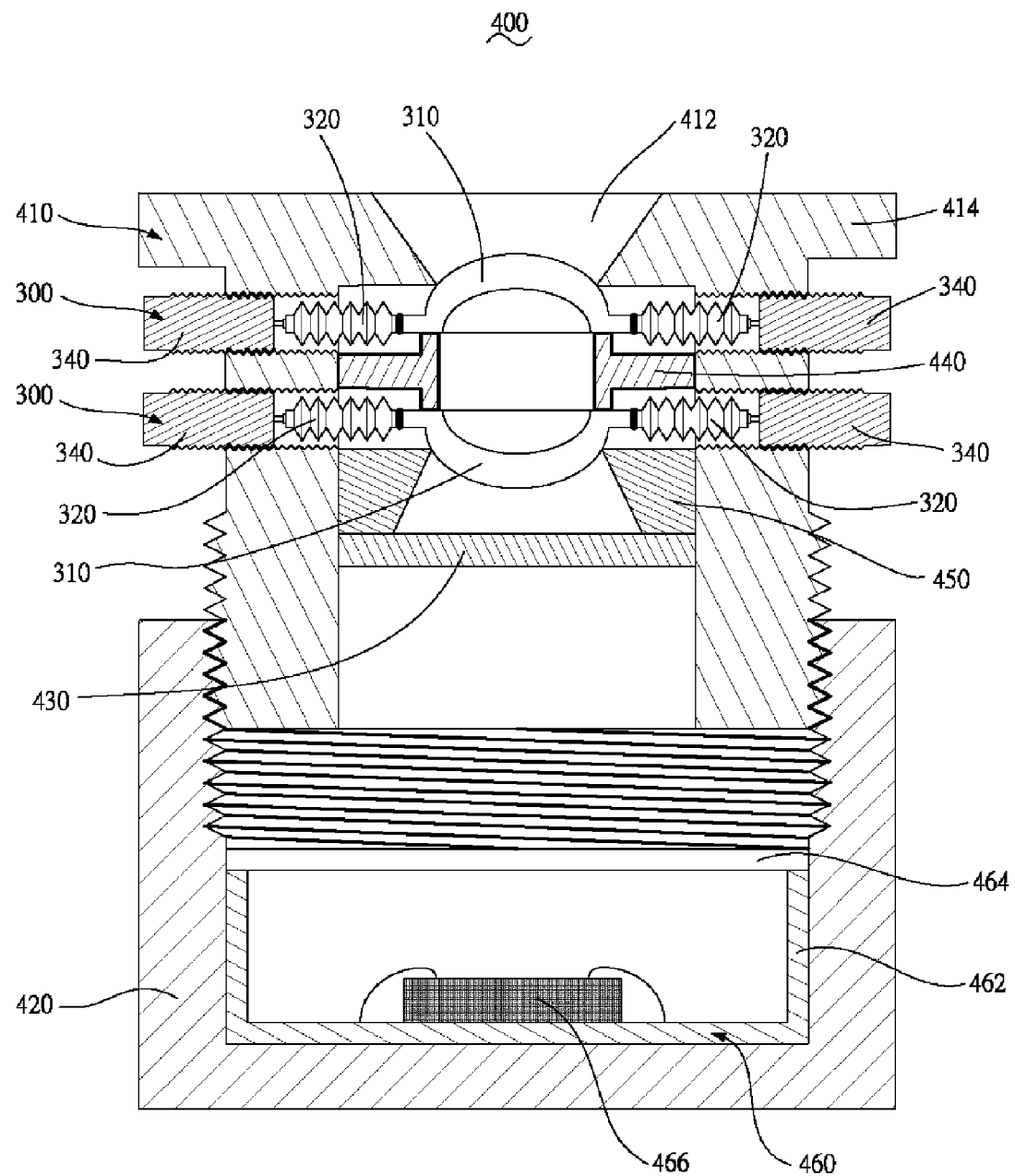
FIG. 7 is a schematic, cross-sectional view of a lens module in accordance with a fourth embodiment.

Referring to FIG. 7, in another embodiment, a lens module 400 mainly includes an inner barrel 410, two variable focal length lenses 300 and an outer barrel 420. The outer barrel 420 is coupled with and movable relative to the inner barrel 410 through a screw portion. A ladder through hole 412 is formed in the inner barrel 410. The lens module 400 further includes a filter 430, and two spacers 440, 450. The two variable focal length lenses 300 and the filter 430 are arranged in the ladder through hole 412 in sequence. One of the two variable focal length lenses 300 contacts with a front end 414 of the inner barrel 410. The spacer 440 is set between the two variable focal length lenses 300, and the spacer 450 is set between the other of the two variable focal length lenses 300 and the filter 430.

In the illustrated embodiment, the lens module 400 further includes an image sensor device 460 mounted in the bottom of the outer barrel 420. According to the illustrated embodiment, the image sensor device 460 is optically aligned with the two variable focal length lenses 300 and includes an enclosure 462 having an opening thereon, a sealing plate 464 covering the opening, and an image sensor 466 received in the enclosure 462. In general, the sealing plate 464 may be a transparent glass plate configured for preventing pollution of the image sensor 466. The image sensor 466 may be, for example, a sensitive film, a complementary metal-oxide semiconductor (CMOS) image sensor or a charge coupled device (CCD) image sensor. The image sensor 466 can be fixed in the bottom of the outer barrel 420. In the present embodiment, the image sensor 466 is secured in the bottom of the enclosure 462.

It can be understood that, although two variable focal length lenses 300 are exemplarily illustrated herein, greater or fewer numbers of the lens 300 can be optionally employed by those skilled in the art, according to the principles of the present inventions and should be considered to be within the scope of the present invention. In the present embodiment, the two variable focal length lenses 300 are arranged opposite to each other. The driving devices 340 of the variable focal length lenses 300 match with the inner barrel 410 through a screw portion. The driving devices 340 exert a force on the lens deforming devices 320, and the lens deforming devices 320 are elongated or compressed under the action of the force, and the lens body 310 is deformed to causing the focal length vary. The lens module 400 with the variable focal length lens 300 can thus auto focus and zoom without requiring an actuator.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A variable focal length lens comprising:
   a deformable lens body having a meniscus shape and defining an optical axis; and
   at least one lens deforming device arranged around the lens body, the at least one lens deforming device being a bellows mechanism surrounding the lens body therein and configured for radially elongating and radially compressing the lens body in directions substantially perpendicular to the optical axis, thereby deforming the lens body so as to adjust an effective focal length associated with the lens body.

2. The variable focal length lens as claimed in claim 1, wherein a center thickness of the lens body is in the range from about 50 microns to about 500 microns.

3. The variable focal length lens as claimed in claim 1, wherein a diameter of the lens body is in the range from about 2 mm to about 4 mm.

4. The variable focal length lens as claimed in claim 1, wherein the lens body is comprised of a material selected from the group consisting of silicone rubber, polyethylene, polypropylene, modified polystyrene, transparent polyurethane elastomer, polyethylene terephthalate, cyclic olefin polymer, and any combination thereof.

5. The variable focal length lens as claimed in claim 1, wherein the at least one lens deforming device is connected to the lens body using epoxy resin adhesive.

6. The variable focal length lens as claimed in claim 1, further comprising a plurality of driving devices surrounding the at least one lens deforming device and configured for driving the at least one lens deforming device to radially expand and radially contract in the directions substantially perpendicular to the optical axis.

7. The variable focal length lens as claimed in claim 6, wherein each of the driving devices is connected to the at least one lens deforming device.

8. The variable focal length lens as claimed in claim 6, wherein there are at least three driving devices.

9. A lens module comprising:
a barrel; and
at least one variable focal length lens as described in claim 1, the at least one lens deforming device of the at least one variable focal length lens being mounted in the barrel.

10. The lens module as claimed in claim 9, wherein the at least one lens deforming device is a bellows mechanism surrounding the lens body therein.

11. The lens module as claimed in claim 9, wherein a center thickness of the lens body is in the range from about 50 microns to about 500 microns.

12. The lens module as claimed in claim 9, wherein a diameter of the lens body is in the range from about 2 mm to about 4 mm.

13. The lens module as claimed in claim 9, wherein the lens body is comprised of a material selected from the group consisting of silicone rubber, polyethylene, polypropylene, modified polystyrene, transparent polyurethane elastomer, polyethylene terephthalate, cyclic olefin polymer, and any combination thereof.

14. The lens module as claimed in claim 9, wherein the at least one lens deforming device is connected to the lens body using epoxy resin adhesive.

15. The lens module as claimed in claim 9, further comprising a plurality of driving devices surrounding the at least one lens deforming device and configured for driving the at least one lens deforming device to radially expand and radially contract in the directions substantially perpendicular to the optical axis.

16. The lens module as claimed in claim 15, wherein each of the driving devices is connected to the at least one lens deforming device.

17. The lens module as claimed in claim 15, wherein there are at least three driving devices.

18. A lens module comprising:
a barrel;
at least one variable focal length lens as described in claim 1, the at least one lens deforming device of the at least one variable focal length lens being mounted in the barrel; and
at least three driving devices surrounding the at least one lens deforming device and configured for driving the at least one lens deforming device to radially expand or contract in the directions substantially perpendicular to the optical axis.

19. The lens module as claimed in claim 18, wherein the at least one lens deforming device is a bellows mechanism surrounding the lens body therein.

\* \* \* \* \*